US010441971B2

(12) United States Patent
Masson

(10) Patent No.: US 10,441,971 B2
(45) Date of Patent: Oct. 15, 2019

(54) PROCESS FOR COATING A SUBSTRATE BODY

(71) Applicant: UMICORE AG & CO. KG, Hanau-Wolfgang (DE)

(72) Inventor: Stéphane Masson, Village Neuf (FR)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 15/503,588

(22) PCT Filed: Aug. 5, 2015

(86) PCT No.: PCT/EP2015/068108
§ 371 (c)(1),
(2) Date: Feb. 13, 2017

(87) PCT Pub. No.: WO2016/023810
PCT Pub. Date: Feb. 18, 2016

(65) Prior Publication Data
US 2017/0232472 A1 Aug. 17, 2017

(30) Foreign Application Priority Data

Aug. 14, 2014 (EP) ..................................... 14180973

(51) Int. Cl.
*B05D 7/22* (2006.01)
*B05D 1/18* (2006.01)
(Continued)

(52) U.S. Cl.
CPC ............ *B05D 7/22* (2013.01); *B01J 35/0006* (2013.01); *B01J 35/04* (2013.01); *B01J 37/0215* (2013.01);
(Continued)

(58) Field of Classification Search
CPC .... B05C 3/02; B05C 7/04; B05D 7/22; B05D 2254/04; B05D 2259/00; C04B 38/0006;
(Continued)

(56) References Cited

U.S. PATENT DOCUMENTS 6,648,943 B2 * 11/2003 Possanza ........... B01D 19/0078
95/30
8,794,178 B2 * 8/2014 Mergner ............ B01D 53/9472
118/408
(Continued)

FOREIGN PATENT DOCUMENTS

DE 102010007499 A1 8/2011
DE 10 2010 007499 * 11/2011
(Continued)

OTHER PUBLICATIONS

Written Opinion of the Internationals Searching Authority dated Feb. 18, 2016 for PCT/EP2015/068108 (6 pages).
(Continued)

*Primary Examiner* — William P Fletcher, III
(74) *Attorney, Agent, or Firm* — Smith, Gambrell & Russell, LLP

(57) ABSTRACT

A method of catalytically coating a honeycomb monolith, in particular a so-called flow-through monolith, is featured. The process involves quite precisely coating the monolith with a method that uses an indirect coating via a displacement body. The method included controlling the process by monitoring certain measures and controlling the liquid coating medium feed as to limit bubble formation in the liquid coating medium.

22 Claims, 3 Drawing Sheets

(51) Int. Cl.
| | | |
|---|---|---|
| *C04B 38/00* | (2006.01) | |
| *F01N 3/022* | (2006.01) | |
| *B01J 37/02* | (2006.01) | |
| *B01J 35/00* | (2006.01) | |
| *B01J 35/04* | (2006.01) | |
| *B05C 3/02* | (2006.01) | |
| *B05C 7/04* | (2006.01) | |
| *F01N 3/28* | (2006.01) | |

(52) U.S. Cl.
CPC ....... *B01J 37/0246* (2013.01); *B01J 37/0248* (2013.01); *B05C 3/02* (2013.01); *B05C 7/04* (2013.01); *B05D 1/18* (2013.01); *C04B 38/0006* (2013.01); *C04B 38/0012* (2013.01); *F01N 3/0222* (2013.01); *F01N 3/28* (2013.01); *B05D 2254/04* (2013.01); *B05D 2259/00* (2013.01); *F01N 2230/06* (2013.01); *F01N 2510/06* (2013.01)

(58) Field of Classification Search
CPC ............... C04B 38/0012; F01N 3/0222; F01N 2330/06; F01N 2350/02
USPC .................................................. 427/230–237
See application file for complete search history.

(56) References Cited

U.S. PATENT DOCUMENTS

| | | |
|---|---|---|
| 2003/0044520 A1 | 3/2003 | Kiessling et al. |
| 2007/0178275 A1* | 8/2007 | Takahashi .......... B01D 46/2418 428/116 |
| 2012/0321537 A1 | 12/2012 | Mergner et al. |

FOREIGN PATENT DOCUMENTS

| | | | |
|---|---|---|---|
| EP | 1273344 | A1 | 1/2003 |
| EP | 2116351 | A1 | 11/2009 |
| EP | 2415522 | A1 | 2/2012 |
| EP | 2 415 522 | A1 * | 8/2012 |
| EP | 2537655 | A1 | 12/2012 |

OTHER PUBLICATIONS

International Preliminary Report on Patentability dated Feb. 14, 2017 for PCT/EP2015/068108 (7 pages).

International Search Report for PCT/EP2015/066108, dated Oct. 23, 2015 in English Language.

* cited by examiner

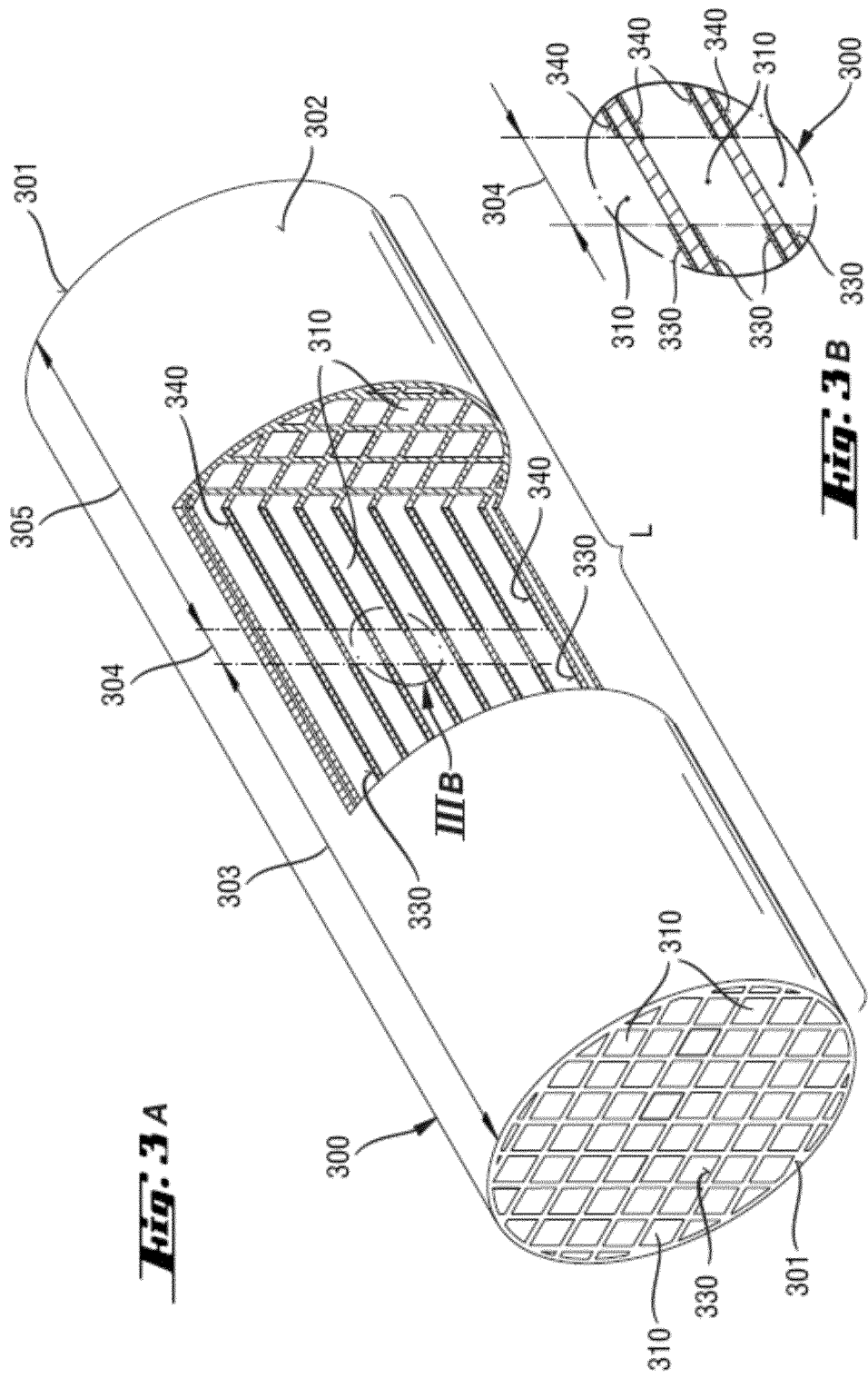

PROCESS FOR COATING A SUBSTRATE BODY

FIELD OF THE INVENTION

The present invention is directed to a certain method of catalytically coating a honeycomb monolith, in particular a so-called flow-through monolith. These types of monoliths can quite precisely be coated by a method using an indirect coating via a displacement body. The present invention further improves this method through controlling the process by certain measures.

BACKGROUND

It is well known in the field of combustion engines that fuel combustion is not complete and yield emissions of pollutants like unburned hydrocarbons (HC), carbon monoxide (CO), nitrogen oxides ($NO_x$) and particulate matter (PM). In order to improve air quality, emission limit legislations are in place to achieve lower emissions of pollutants from stationary applications and from mobile sources. For mobile sources like passenger cars, primary measures enabled achieving decrease in the emission of pollutants. Im-provement of fuel-air mixing as primary measure yielded considerable dimi-nution of pollutants. However, due to more stringent legislations over the years, the use of heterogeneous catalysts has been made inevitable.

An important aspect of producing these heterogeneous catalysts is the pre-cise coating of substrate bodies used in terms of, e.g. coating length, coating quantity applied, evenness of coating layer, and uniformity of coating length. In order to achieve this, up to now several coating strategies have been employed that try to provide well coated monolithic bodies, advantageously in as few time as possible.

One possibility for coating substrate bodies is to bring the openings on one side thereof into contact with the coating medium and to draw the liquid coating medium through the openings, e.g. channels, of the substrate by applying a vacuum to the opposite side of the substrate. If the intention is to coat the channels on only part of the length thereof, it is disadvanta-geous that different channels are coated over different lengths due to the inevitably individual flow profile which arises from channel to channel.

If the coating medium is forced into the channels by pressure against the force of gravity, there is then a need to check (generally by means of a sensor) when the liquid emerges at the top in the case of complete coating of the channels. In the case of coating over part of the length of the channels, the height of the liquid column of coating medium within the channels is usually determined by direct or indirect measurement through sensors (capacity sensor; visual sensor; IR-sensor; vibrational sensor). However, also in this case an inhomogeneous coating front within the channels of a monolith can result, e.g. If coating is started with an uneven slurry surface formed in the coating chamber below the monolith. The latter occurs, in particular, if fast coating speeds are applied and coating slurry tends to get turbulent while being pumped into the coating chamber within a short timeframe.

In DE102010007499A1 a preferred coating apparatus and method is dis-closed where cylindrical support bodies, each having two end faces, a circumferential surface and an axial length L, further being traversed from the first end face to the second end face by a multiplicity of channels, are coated with a liquid coating media. The apparatus in question has a cylinder filled with a liquid and has a piston, wherein the liquid-filled cylinder communicates with a tank, in the interior of which a displacement body is arranged in such a way that, when the piston is moved, the displacement body is moved proportionally by the liquid. The tank communicates with the coating device for the substrate, thus the displacement body acts on the liquid coating medium, with the result that a proportional change in the level of liquid coating medium in the coating device is brought about (see FIG. 1 of that application). Two sensors are arranged on the same height in the coating device in order to check whether the position of the slurry surface in the coating chamber has reached a certain level.

In view to accelerate the coating process even further with this type of coating device a factor is the speed with which
 i. the coating liquid can be submitted into the substrate, and
 ii. the displacement body can be deflated again in order to let new coating media flow into the coating tank.

This speed is directly related to the velocity of the movement of the piston in the liquid-filled cylinder that communicates with the displacement body. If speed for i. and/or ii. is increased certain defects occur in the coating which may mean that the flow and pressure conditions in some channels of a substrate differ greatly from the other channels, the effect being that the liquid coating medium penetrates with considerably more or considerably less difficulty and is deposited either over a shorter or longer length of the individual channels under the coating conditions.

E.g., it has been discovered that gas bubbles can appear in the liquid coating media. Because of the sometimes very high viscosity of the coating slurry these gas bubbles survive and are carried towards the coating chamber and into the substrate monolith, which in turn lead to mentioned defects, e.g. to unevenly or non-uniformly coated products if the bubbles finally enter a channel of the monolith.

BRIEF SUMMARY OF THE INVENTION

The objective of the present invention is to dispense with this drawback. In particular, the aim of the present invention is to present a method for coating a monolithic substrate with an apparatus as depicted above without the fear of having inhomogeneous coating slurries, especially due to bubble formation in it. In addition, a process for coating a monolithic substrate should be proposed that allows to safely coat these monoliths with envis-aged device in a minimum amount of time.

BRIEF DESCRIPTION OF THE DRAWINGS

FIG. 3A is a cut away view of a coated substrate.

FIG. 3B is an enlarged view of the circled region of FIG. 3A.

DETAILED DESCRIPTION

Figure 1:
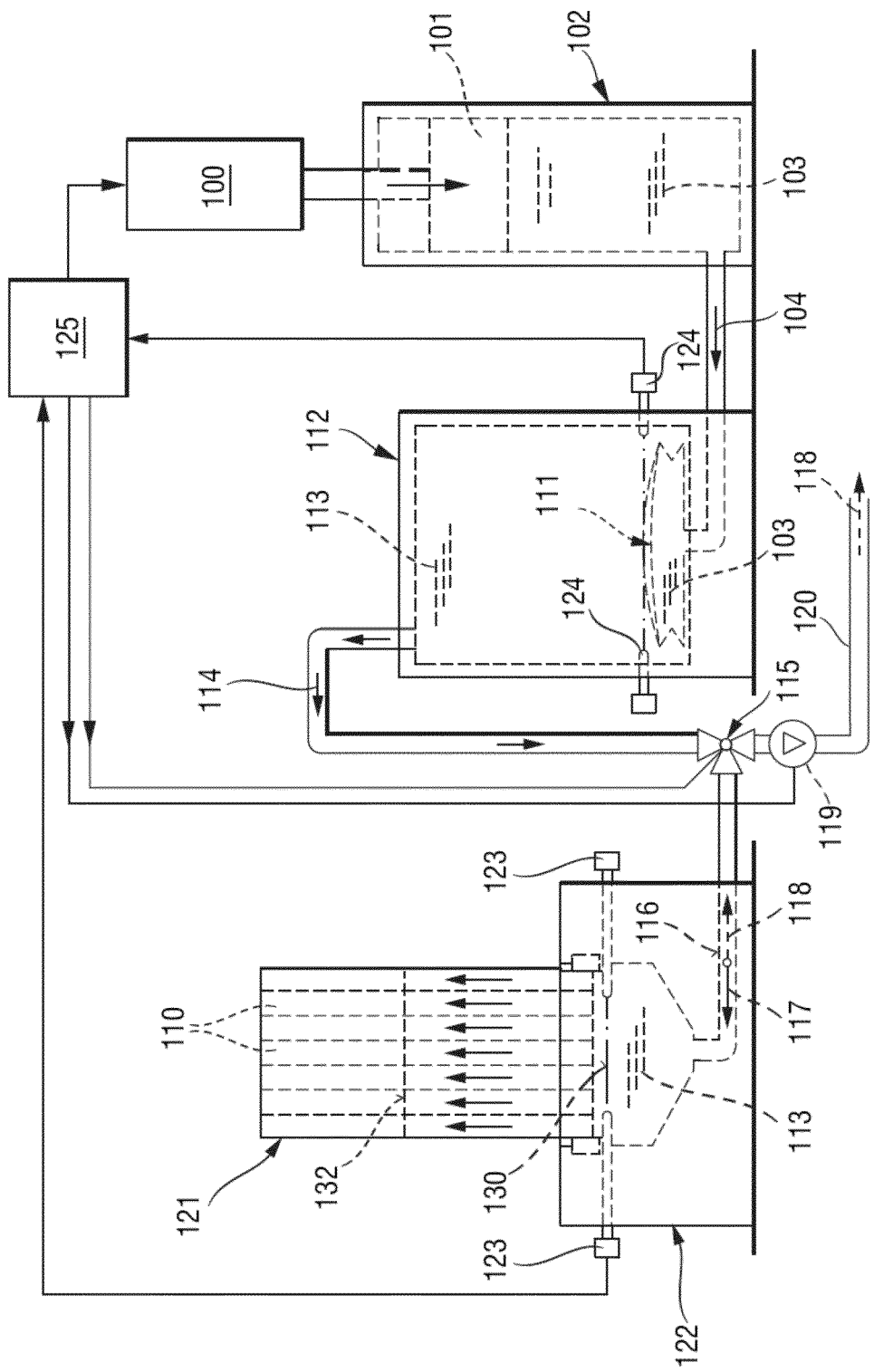
FIG. 1 is a schematic depiction of a first type of substrate coating apparatus.

The present invention is inclusive of a process for coating substrates for the production of exhaust gas purification catalysts, particularly for motor vehicles, which are cylindrical support bodies and each have two end faces (301), a circumferential surface (302) and an axial length L and are traversed from the first end face to the second end face by a multiplicity of channels (310), with liquid coating media, which has a cylinder (102) filled with a liquid (103) and having a piston (101), wherein the liquid-filled cylinder (102) communicates with a tank (112), in the interior of which a displacement body (111) is arranged in such a way that, when the piston (101) is moved, the displacement body (111) is moved proportionally by the liquid (103), and the tank (112) communicates with the coating device (122) for the substrate, wherein the displacement body (111) acts on the liquid coating medium (113), with the result that a back-proportional change in the level of liquid coating medium (113) in the coating device (122) is brought about;

the movement of the piston (101), which leads to deflation of the displacement body (111) (so-called: backstroke), is controlled in such a way that a velocity of the piston (101) is not overshot and thereby avoiding the appearance of bubbles in the washcoat, the present invention rather surprisingly but nonetheless advantageously solves the problems associated with instant coating technology and greatly decreases the risk of gas formation within the washcoat slurry.

The appearance of bubbles, obviously, is enhanced by applying too high an underpressure in the washcoat reservoir (112). If the velocity of the movement of the piston (101) in the backstroke phase is too high such disadvantageous underpressure may result. However, the generation of bubbles in the coating medium is strongly dependent also on the character of the slurry and the components being present therein. Hence, the threshold value for the velocity of the backstroke of the piston (101) which is not to be overshot has to be set individually for each coating medium (washcoat). The threshold value can be determined in preliminary trial experiments and then be applied accordingly to the controller unit (125) of the coating device. In tests it has been determined that for usual washcoat slurries a velocity of the piston (101), which leads to deflation of the displacement body (111) (backstroke) can vary between 0.01-3, more preferably between 0.05-0.25 and most preferred between 0.08-0.2 m/s.

A main factor for bubble generation and, in particular, for bubble lifetime is the viscosity of the slurry that is coated onto the substrate body. If the viscosity is high, bubbles tend to survive a considerably period of time and endanger their appearance in the coating chamber. Hence, taken the position that the coating time should be as low as possible in order to coat as much parts as possible in a certain period of time and advantageously keeping the backstroke of the piston (101) in the above time frame, the viscosity of the liquid coating medium (113) shall be between 2-200 mPa*s.

It has further turned out that a certain kind of profile of the backstroke movement of the piston (101) has an influence on the generation of gases in the washcoat slurry. Several such profiles can come to the mind of the skilled worker in this regard. However, in a preferred aspect the velocity of the piston (101), which leads to deflation of the displacement body (111) (backstroke) is controlled in such a way that the piston is accelerated first and decelerated to the end of its backstroke. In a more preferred mode, the profile of the velocity approaches a Gaussian distribution curve profile. In a very preferred embodiment, the highest velocity of the backstroke of the piston (101) is not more than 0.5 times, preferably 1 times, and most preferably 5 times the velocity at a position of 10% of the way of the piston (101) after start of the backstroke.

Checking and controlling the backstroke of the piston (101) can be done by devices known to the skilled worker. The movement of the piston, generally, is controlled by the controller unit (125). Normally, the controller unit (125) can rely on stored data for managing the movement of the piston (101) according to the present invention. However, the movement of the piston (125) can also be done by certain sensors applied to the coating device, whereby the sensor used to control the velocity of the piston (101) is selected from the group consisting of pressure sensor, level sensor and conductivity sensor.

In a very preferred embodiment of the present invention a so-called in-process-control is used to manage the backstroke movement of the piston (101). When moving back the piston (101) into its initial position, and thus producing an underpressure in the liquid coating slurry, a pressure sensor applied to the washcoat reservoir (112 in FIG. 1; 212 in FIG. 2) will receive a discontinuity in the pressure value measurement if bubbles occur in the washcoat slurry. Hence, it is advantageous to take this discontinuity of the pressure curve as a point to control the velocity of the movement of the piston (101). Controlling is done in that the velocity of the piston (101) in the backstroke movement is lowered as soon as the discontinuity arises to at least minimize the appearance of gas bubbles in the washcoat slurry and/or the velocity is kept below this discontinuity point to avoid bubble formation at all. This type of controlling is greatly preferred and utmost advantageous in view of the fact that the washcoat and its physical proper-ties may vary over the length of a production campaign. Often the viscosity and, as said earlier, the bubble generation tendency is changing throughout the period of production of a certain catalyst body. Through applying this in-process-control measure the risk of gas formation and thus of bubbles in the coating medium is greatly reduced.

Figure 2:
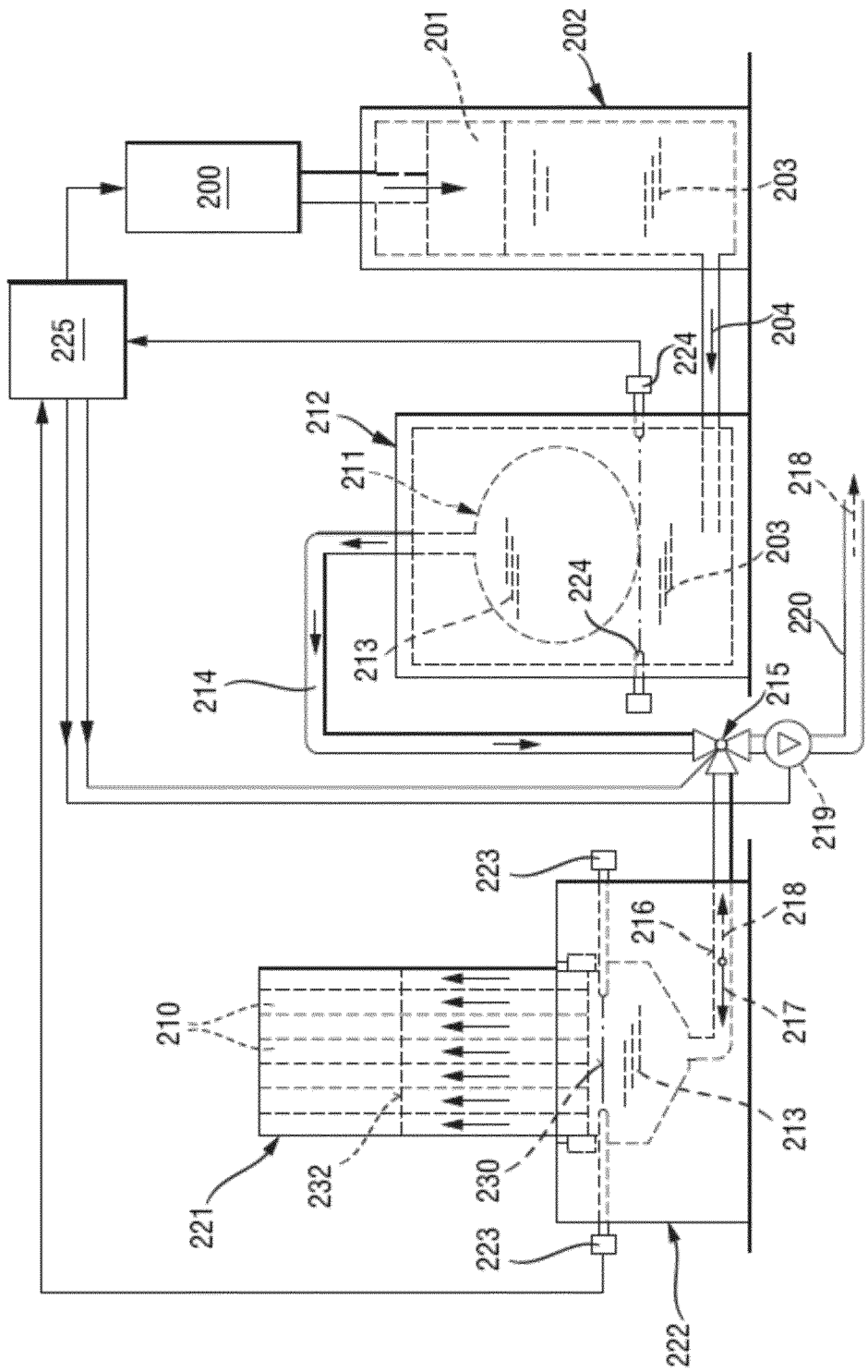
FIG. 2 is a schematic depiction of a second type of substrate coating apparatus.

For performing the coating process of the present invention it is referred to the disclosure DE102010007499A1, which is incorporated herein in its en-tirety, at least in view of the aspects directed to the device features. In particular, the preferred characteristics of the process mentioned in DE102010007499A1 apply mutatis mutandis also to the process of present invention. It is likewise noted that references made herein to FIG. 1 are deemed to be made to FIG. 2 accordingly for the same aspect. It has to be noted though that FIG. 2 is different from FIG. 1 in that deflation and inflation of the displacement body (111) or (211) are anti-cyclic. Hence, when talking about an embodiment according to FIG. 2 in the above text "deflation" has to be exchanged for "inflation". Other aspects may receive a simi-lar interpretation according to the above said.

The substrate used (121, 221) is generally a hollow substrate which is composed of metals or ceramics and has at least one inner channel (110, 210, 310), generally a multiplicity of inner channels. The substrates are generally substantially cylindrical support bodies, which each have a cylinder axis, two end faces, a circumferential surface and an axial length L and are traversed from the first end face to the second end face by a multiplicity of channels. Such support bodies are often also referred to as honeycomb bodies. In particular, the substrates can be flow-through honeycomb bodies or monoliths but also wall-flow-filters. The substrate can be composed of, for example, cordierite, mullite, aluminum titanate, silicon carbide or metals such as steel or stainless steel. The substrate is advantageously a monolithic, cylindrically shaped catalyst support body and is traversed by a multiplicity of flow channels parallel to the cylinder axis for the exhaust gases from internal combustion engines. Such monolithic catalyst support bodies are used on a large scale for the production of automotive exhaust gas catalysts. The cross-sectional shape of the catalyst support bodies depends on the installation requirements on the motor vehicle. Catalyst bodies with a round cross section, an elliptical or a triangular or hexagonal cross section are widely used. The flow channels generally have a square, rectangular, hexagonal, triangular, rhomboedric or other cross section and are arranged in a narrowly spaced pattern over the entire cross section of the catalyst bodies. The channel or cell density of the flow channels generally varies between 10 and 250 $cm^{-2}$, depending on the application. For exhaust gas purification on motor cars, catalyst support bodies with cell densities of about 62 $cm^{-2}$ are still frequently used nowadays. The wall thicknesses, i.e. the thickness of the walls which separate the channels of the substrate from one another, are usually from about 0.005 cm to about 0.25 cm.

The substrate is advantageously arranged on the coating device (122, 222) in a liquid-tight manner, it being possible to achieve this by means of at least one seal. The seal can be hollow and can be filled with gas or liquid as the substrate is mounted on or inserted into the coating device (122, 222), and thus can form a leak tight closure. The leak tightness of the joint can be checked by means of a pressure or flow sensor.

The liquid coating medium (113, 213) is, for example, a suspension or dispersion for coating exhaust gas catalysts (flow-through monoliths or filters) for motor vehicles ("washcoat") which contains catalytically active components or precursors thereof and inorganic oxides such as aluminum oxide, titanium dioxide, zirconium oxide or a combination thereof, it being possible for the oxides to be doped with silicon or lanthanum, for example. Oxides of vanadium, chromium, manganese, iron, cobalt, copper, zinc, nickel or rare earth metals such as lanthanum, cerium, praseodymium, neodymium, pro-methium, samarium, europium, gadolinium, terbium, dysprosium, holmium, erbium, thulium, ytterbium or combinations thereof can be used as catalytically active components. Noble metals such as platinum, palladium, gold, rhodium, iridium, osmium, ruthenium and combinations thereof can also be used as catalytically active components. These metals can also be present as alloys with one another or with other metals or as oxides. The metals can also be present as precursors, such as nitrates, sulfites or organyls of said noble metals and mixtures thereof, and, in particular, palladium nitrate, palladium sulfite, platinum nitrate, platinum sulfite or $Pt(NH_3)_4(NO_3)_2$ can be used in the liquid coating medium. By calcination at about 400° C. to about 700° C., the catalytically active component can then be obtained from the precursor. To coat a substrate for the production of automotive exhaust gas catalysts, a suspension or dispersion of an inorganic oxide can initially be used for coating, after which, in a subsequent coating step, a suspension or dispersion which contains one or more catalytically active components can be applied. However, it is also possible for the liquid coating medium to contain both of these components. The liquid coating medium often has a solids content of between 35% and 52%.

The finished substrates (i.e. coated and heat-treated or calcined substrates), which are suitable for the production of exhaust gas catalysts for motor vehicles, have a particularly uniform coating, which is characterized in that the coated lengths of the different channels differ from one another by no more than 5 mm, in particular 3 mm, this applying to at least 95% of all the channels of a substrate, advantageously at least 99% of all the channels of a substrate, in particular 100% of all the channels. In this case, the coated length of the channels is less than the axial length L. The uniform coating length has the advantage that it is possible in this way to in-troduce two coatings from the mutually opposite ends of the respective substrate.

If these coatings are different and have to be separate from one another (e.g. because the coating components react with one another in an unwanted way or impair each other in their action), a spacing must be maintained and reliably ensured between the two coatings. It is advantageous here if the coating length can be set as accurately and reliably as possible since, in this way, only a short length of the substrate has to be used for the spacing between the coatings, remaining uncoated and thus inoperative. It is thereby possible to achieve improved exhaust gas purification or to reduce the charging of the substrate with coating.

It is thus possible, in a particularly advantageous way, to use the method of the invention to obtain a coated substrate for the production of exhaust gas catalysts for motor vehicles in which the channels are provided on the inside with at least one first catalytically active coating and on the outlet with one second catalytically active coating, the channel lengths coated with the first catalytically active coating and the second catalytically active coating are in each case less than the axial length L of the substrate and, in the case of at least 95% of the channels of a substrate, the channel lengths coated with the first catalytically active coating and the second catalytically active coating respectively differ by no more than 5 mm, preferably 3 mm, from one another, and wherein the spacing between the two coatings in the case of at least 95% of the channels of a substrate is no more than 5 mm, advantageously no more than 3 mm, in particular no more than 1 mm.

FIGS. 3A and 3B show a coated substrate (300) of this kind. The substrate has two end faces (301), a circumferential surface (302) and a length (L) and is traversed by a multiplicity of channels (310) between the end faces. In this case, the channels are provided with a first coating (330) over a first partial length (303) and with a second coating (340) over a further partial length (305), indicated by thickened lines in FIG. 3A, which form two zones, provided respectively with a first and a second coating. The spacing (304) between the two zones (303, 305) is preferably minimized, for which purpose as uniform a coating length as possible is necessary in both zones (303, 305) in order to avoid overlapping. According to this invention, this coating-free spacing (304) is no more than 5 mm, advantageously no more than 3 mm, in particular no more than 1 mm. In this FIG. 3A, a substrate (300) with circular end faces is illustrated. It is, of course, also possible for the end faces to have rectangular, square, oval, triangular, hexagonal or other polygonal shapes, resulting in a corresponding different three-dimensional shape of the substrate, e.g. prismatic or cuboidal. The first and second coatings and their partial lengths provided with the first (330) and the second (340) coating can be the same or different, and can show a gap as noted above or can overlap at least to a certain extent.

The first and second coatings are advantageously of different types. In one embodiment of the invention, at least one of the coatings is an oxidation catalyst or an SCR catalyst. In a particularly advantageous embodiment of the invention, the first coating (330) is an SCR catalyst and the second coating (340) is an oxidation catalyst for the oxidation of $NH_3$, HC, and CO.

It is advantageous if the oxidation catalyst contains a noble metal of group VIII of the periodic table of elements, such as platinum, palladium, ruthenium, rhodium, gold, iridium or mixtures thereof, advantageously on a porous, solid support, generally a porous inorganic oxide, such as aluminum oxide or silicon dioxide. Platinum on a porous aluminum oxide and/or zeolite as a support is particularly advantageous. This coating on the coated substrate generally contains 0.1 to 10 g/ft$^3$, preferably 0.5-5 g/ft$^3$ of platinum.

In a specific embodiment of the invention, the SCR catalyst contains an oxide chosen from the group comprising titanium dioxide, vanadium pentoxide, tungsten trioxide, cerium oxide, zirconium oxide, or mixtures thereof.

In another specific embodiment of the invention, the SCR catalyst contains titanium dioxide as a matrix, up to 10% by weight of vanadium pentoxide and up to 20% by weight of tungsten trioxide. In another specific embodiment of the invention, the first coating contains an SCR catalyst containing vanadium pentoxide and aluminum oxide, and the second coating contains an oxidation catalyst which contains platinum, gold, palladium and aluminum oxide. In this case, the second coating preferably contains 0.1 to 10 g/ft$^3$, preferably 0.5-5 g/ft$^3$ of platinum, gold or a combination thereof. In another specific embodiment of the invention, the first coating contains an SCR catalyst containing titanium dioxide, vanadium pentoxide and tungsten trioxide, and the second coating contains an oxidation catalyst which contains platinum and aluminum oxide and/or a zeolite. In this case, the second coating preferably contains 0.1 to 10 g/ft$^3$, preferably 0.5-5 g/ft$^3$ of platinum.

In another specific embodiment of the invention, the first coating contains an SCR catalyst containing a composition of a zeolite or zeotype, e.g. a small pore molecular sieve such as chabazite or erionite or levyne or SAPO-34, in particular a molecular sieve exchanged with iron or copper, and the second coating contains an oxidation catalyst which comprises platinum and aluminum oxide and/or a zeolite as mentioned above. In this case, the second coating preferably contains 0.1 to 10 g/ft$^3$, preferably 0.5-5 g/ft$^3$ of platinum.

In another specific embodiment of the invention, the first coating contains an SCR catalyst containing a chabazite zeolite exchanged with copper and having an ammonia storage capacity of at least 20 milliliters of ammonia per gram of catalyst material, and the second coating contains an oxidation catalyst which contains platinum and aluminum oxide and/or a zeolite like chabazite. In this case, the second coating preferably contains 0.1 to 10 g/ft$^3$, preferably 0.5-5 g/ft$^3$ of platinum.

In view of filter substrates, which are suitable for the production of exhaust gas filters for motor vehicles according to the present process, they preferably have a porosity of more than 40%, generally from 40% to 75%, in particular from 45% to 60%. The mean pore size is at least 7 μm, e.g. from 7 μm to 34 μm, preferably more than 10 μm, in particular from 10 μm to 20 μm or from 11 μm to 19 μm. Finished substrates suitable for the production of exhaust gas filters for motor vehicles which have a mean pore size of 11 to 33 μm and a porosity of 40% to 60% are particularly advantageous.

In the figures, FIG. 1 shows an arrangement for coating channels (110) in a substrate (121), which has a piston (101), actuated by an actuator (100), in a cylinder (102), which is filled with liquid (103) and, through a connection (104) of the cylinder (102) to the displacement body (111), allows the actuation of the displacement body (111) in the tank (112), which is filled with liquid coating medium (113) and has two line sections (114, 116) with an interposed multiway valve (115) between the tank (112) and the coating device (122), wherein the coating device (122) is provided with the substrate (121) and with sensors (123) for determining the first level (130). Additional sensors (124) are used to monitor the displacement volume of the coating medium (113) and the state of the displacement body (111) in the tank (112).

The values determined by the sensors (123, 124) are transmitted to a control unit (125) which, for its part, controls the actuator (100) and hence the piston (101).

On the one hand, the multiway valve (115) switches the filling of the coating device (122) with coating medium (113) up to the first level (130) in the filling flow direction (117) and, on the other hand, after the second level (132) in the substrate (121) is reached, switches, in the return flow direction (118), the connection to the discharge pump (119) and to the connecting line (120) leading to a storage tank for excess coating medium (113) and for holding it ready for further use.

All the control commands required for this purpose are preferably likewise output by the central control unit (125).

In the figures, FIG. 2 shows an arrangement for coating channels (210) in a substrate (221), which has a piston (201), actuated by an actuator (200), in a cylinder (202), which is filled with liquid (203) and, through a connection (204) of the cylinder (202), communicates with the tank (212), in which the displacement body (211) is situated, which contains liquid coating medium (213) and is connected via two line sections (214, 216) with an interposed multiway valve (215) to the coating device (222), which is provided with a substrate (221) and sensors (223) for determining the first level (230) of coating medium (213).

By means of the additional sensors (224) on the tank (212), the displacement volume of coating medium and the state of the displacement body (211) in the tank (212) are monitored. The values determined by the sensors (223, 224) are transmitted to a control unit (225) which, for its part, controls the actuator (200) and hence the piston (201).

On the one hand, the multiway valve (215) switches the filling of the coating device (222) with coating medium (213) up to the first level (230) in the filling flow direction (217) and, on the other hand, after the second level (232) in the substrate (221) is reached, switches, in the return flow direction (218), the connection to the discharge pump (219) and to the connecting line (220) leading to a storage tank for excess coating medium (213) and for holding it ready for further use. All the control commands required for this purpose are preferably likewise output by the central control unit (225).

In the figures, FIGS. 3A and 3B show in perspective a substrate (300), which has a section broken away in three planes in the central part thereof to make it possible to see into the coating structure according to the invention.

The substrate (300), which is coated in two partial length zones (303, 305), has two end faces (301), a circumferential surface (302) and a length (L) and is traversed by a multiplicity of channels (310) between the two end faces (301).

A first coating (330) is applied to a first partial length zone (303) in the channels (310), while a further partial length zone (305) is provided with a second coating (340).

Between the two partial length zones (303) and (305) or between the two coatings (330) and (340) there is a coating-free zone (304), as FIG. 3B, in particular, shows on an enlarged scale.

REFERENCE LISTING FOR DRAWINGS

FIG. 1:
100 actuator
101 piston
102 cylinder 103 liquid
104 connection
110 channels—in the substrate 121
111 displacement body
112 tank
113 coating medium
114 line section
115 multiway valve
116 line section
117 filling flow direction
118 return flow direction to remove coating medium 113
119 discharge pump
120 connecting line leading to the reservoir for the coating medium
121 substrate
122 coating device
123 sensor for detecting the level 130
124 sensor for monitoring the position of the displacement body 111
125 control unit
130 first level—of 113 in the coating device 122
132 second level—of 113 in the substrate 121
FIG. 2:
200 actuator
201 piston
202 cylinder
203 liquid
204 connection
210 channels—in the substrate 221
211 displacement body
212 tank
213 coating medium
214 line section
215 multiway valve
216 line section
217 filling direction
218 extraction flow direction of 213
219 discharge and extraction pump
220 connecting line leading to the reservoir for excess coating medium 213
221 substrate
222 coating device
223 sensor for detecting the level 230
224 sensor for monitoring the position of the displacement body
225 control unit
230 first level—in the coating device 222
232 second level—in the substrate 221
FIG. 3:
300 substrate
301 end face
302 circumferential surface
303 first partial length zone
304 spacing—between the two partial lengths 303 and 305
305 second partial length zone
310 channels—in the substrate 300
330 first coating—in the channels 310
340 second coating—in the channels 310
L total length of the substrate 300

The invention claimed is:

1. A process for applying a washcoat, with a liquid coating medium, to an exhaust gas purification substrate, the substrate having a support body with two end faces and an axial length traversed from the first end face to the second end face by a multiplicity of channels, the process comprising
supplying the liquid coating medium to the substrate with a liquid supply apparatus that comprises a cylinder containing a displacement liquid and a piston, wherein the displacement liquid in the cylinder communicates with a tank, an interior of the tank having a displacement body arranged in such a way that, when the piston is moved, the displacement body is moved proportionally by the displacement liquid, and the tank communicates with a coating device for the substrate, wherein the displacement body acts on the liquid coating medium, with the result that movement of the displacement body brings about a proportional change in the level of liquid coating medium in the coating device, wherein movement of the piston, which leads to an adjustment in the displacement body, is controlled by a control unit that is configured to limit piston velocity as to avoid generation of bubbles in the washcoat.

2. The process according to claim 1, wherein the control unit is configured to limit the velocity of the piston during a movement that leads to a deflation adjustment in the displacement body, and to limit the velocity of the piston during that movement to between 0.01-3 m/s.

3. The process according to claim 2, wherein the viscosity of the liquid coating medium is between 2-200 mPa*s.

4. The process according to claim 2, wherein the control unit controls piston movement during a backstroke movement such that the piston is accelerated at initiation of the backstroke movement and decelerated at an end region of the backstroke movement.

5. The process according to claim 1, wherein the control unit is configured to limit the velocity of the piston during a backstroke movement that leads to a deflation adjustment in the displacement body, and to control the backstroke movement such that the piston is first accelerated and then decelerated to an end of the backstroke movement.

6. The process according to claim 1, wherein the process includes monitoring a sensor that is used to control the velocity of the piston, wherein the sensor is selected from the group consisting of: a pressure sensor, an optical sensor, a conductivity sensor, and a vibration sensor.

7. The process according to claim 1, wherein the velocity of the piston is controlled during a backstroke movement of the piston.

8. The process according to claim 1, wherein the control unit controls piston movement to have a Gaussian distribution velocity curve profile during a backstroke movement.

9. The process according to claim 1, wherein the control unit is configured to limit piston velocity during a movement of the piston leads to a deflation adjustment in the displacement body.

10. The process according to claim 9, wherein the piston generates deflation adjustment in the displacement body during a backstroke.

11. The process according to claim 1, wherein
the liquid supply apparatus further comprises a pressure sensor adapted to detect pressure discontinuities in the tank, and
the control unit is configured to limit the velocity of the piston based on detection of pressure discontinuities by the pressure sensor.

12. The process according to claim 1, wherein
the control unit is configured to execute in-process-control of the movement of the piston, such that the limitation on piston velocity is adjusted over a production campaign based on changes to the viscosity of the liquid coating medium over the production campaign.

13. A coating process for applying a liquid coating medium with a liquid coating apparatus, to form a washcoat on an exhaust gas purification substrate, the substrate having a support body with two end faces and an axial length that is traversed from the first end face to the second end face by a multiplicity of channels, wherein
the coating apparatus comprises:
a cylinder comprising a piston and a displacement liquid;
a tank storing the liquid coating medium, an interior of the tank having a displacement body that is movable by the displacement liquid in the cylinder;
a coating device adapted for receiving an exhaust gas purification substrate, the coating device being in communication with the tank for directing liquid coating medium from the tank to channels of the exhaust gas purification substrate,
wherein the coating apparatus is adapted such that movement of the piston causes a movement of the displacement liquid, with movement of the displacement liquid causing an adjustment in the displacement body, with adjustment of the displacement body causing a proportional change in a level of liquid coating medium in the coating device,
the coating process comprising:
controlling a backstroke movement of the piston by a control unit configured to limit a velocity of the piston during the backstroke movement as to avoid generation of bubbles in the liquid coating medium stored in the tank.

14. The coating process according to claim 13, wherein the velocity of the piston during the backstroke movement is controlled to be between 0.01-3 m/s, the backstroke movement causing a deflation adjustment in the displacement body.

15. The coating process according to claim 14, wherein the viscosity of the liquid coating medium is between 2-200 mPa*s.

16. The coating process according to claim 13, wherein the velocity of the piston during the backstroke movement is controlled such that the piston is accelerated at a beginning of the backstroke movement and decelerated at an end of the backstroke movement, with the backstroke movement causing a deflation adjustment in the displacement body.

17. The coating process according to claim 13, further comprising monitoring a sensor for controlling the velocity of the piston during the backstroke movement, the sensor being selected from the group consisting of: a pressure sensor, an optical sensor, a conductivity sensor, and a vibration sensor.

18. The coating process according to claim 14, wherein the control unit controls piston movement during backstroke movement such that the piston is accelerated at initiation of the backstroke movement and decelerated at an end region of the backstroke movement.

19. The coating process according to claim 13, wherein the control unit controls piston movement to have a Gaussian distribution velocity curve profile during the backstroke movement.

20. The coating process according to claim 13, wherein the backstroke movement of the piston leads to a deflation adjustment in the displacement body.

21. The coating process according to claim 13, wherein
the coating apparatus further comprises a pressure sensor adapted to detect pressure discontinuities in the tank, and
the coating process further comprises limiting the velocity of the piston during the backstroke movement based on detection of pressure discontinuities by the pressure sensor.

22. The coating process according to claim 13, wherein
the control unit is configured to execute in-process-control of the movement of the piston, such that the limitation on piston velocity is adjusted over a production campaign based on changes to the viscosity of the liquid coating medium over the production campaign.

* * * * *